United States Patent [19]

Hernandez

[11] Patent Number: 4,525,067
[45] Date of Patent: Jun. 25, 1985

[54] TWIN-ETALON SCANNING SPECTROMETER

[75] Inventor: Gonzalo J. Hernandez, Boulder, Colo.

[73] Assignee: The United States of America as represented by the Secretary of Commerce, Washington, D.C.

[21] Appl. No.: 436,124

[22] Filed: Oct. 22, 1982

[51] Int. Cl.³ .............................................. G01B 9/02
[52] U.S. Cl. ..................................... 356/346; 356/352
[58] Field of Search ............................... 356/346, 352

[56] References Cited

U.S. PATENT DOCUMENTS 3,373,651 3/1968 Mack et al. .......................... 356/346
3,984,190 10/1976 Barrett et al. ....................... 356/346
4,225,236 9/1980 Sandercock ......................... 356/346

OTHER PUBLICATIONS

Itoh et al, "Brillouin Scattering Study of Gd$_2$(MoO$_4$)$_3$ Using a Double-Fabry-Perot Interferometer", *Japan. J. Appl. Phys.*, vol. 14, Suppl. 14-1, pp. 83-86, 1975.
Kohno, "A Scanning Fabry-Perot Interferometer for Space Research" *Optica Acta* vol. 26, No. 8, pp. 1057-1071, Aug. 1979.
Hernaudez et al. "TESS: A High-Luminosity High-Resolution Twin-Etalon Scanning Spectrometer", *Applied Optics*, vol. 20, No. 21, pp. 3687-3688, Nov. 1981.

Primary Examiner—Davis L. Willis
Assistant Examiner—Matthew W. Koren
Attorney, Agent, or Firm—Eugene J. Pawlikowski; Alvin J. Englert; Robert E. Harris

[57] ABSTRACT

A twin-etalon scanning spectrometer is disclosed that provides high luminosity and high resolution. The etalons are positioned in spaced relationship with respect to one another in series in the path of an emission light source. With identical etalons so positioned, a line emission transmitted by the rearwardly positioned etalon is at the same angles as that of the forwardly positioned etalon and the light transmission through the etalons is therefore at a maximum. When the relative spacing of the light transmission elements of one etalon is changed, however, the angles of transmission of the etalons are mismatched and the transmission of the light through the etalons is decreased until a minimum is reached when a λ/4 change in light transmission element spacing of one etalon relative to the other etalon has been effected. By varying the spacing between maximum and minimum, modulation of the incoming light is effected, which modulated radiation is then collected by a detector with the resulting electrical signals then being processed for display.

18 Claims, 25 Drawing Figures

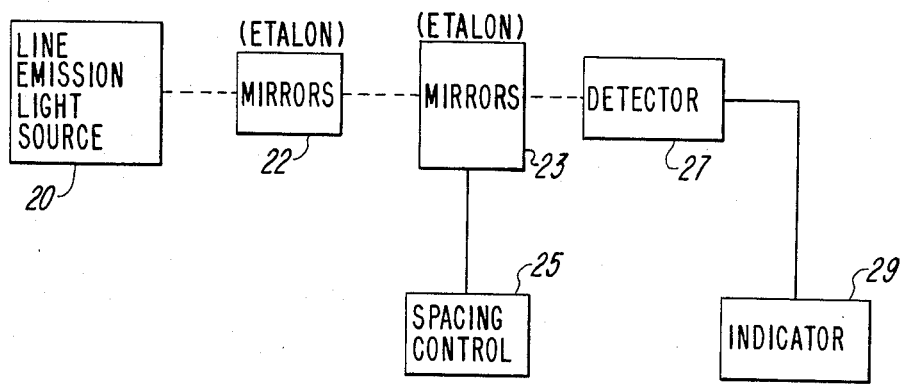
Fig_1
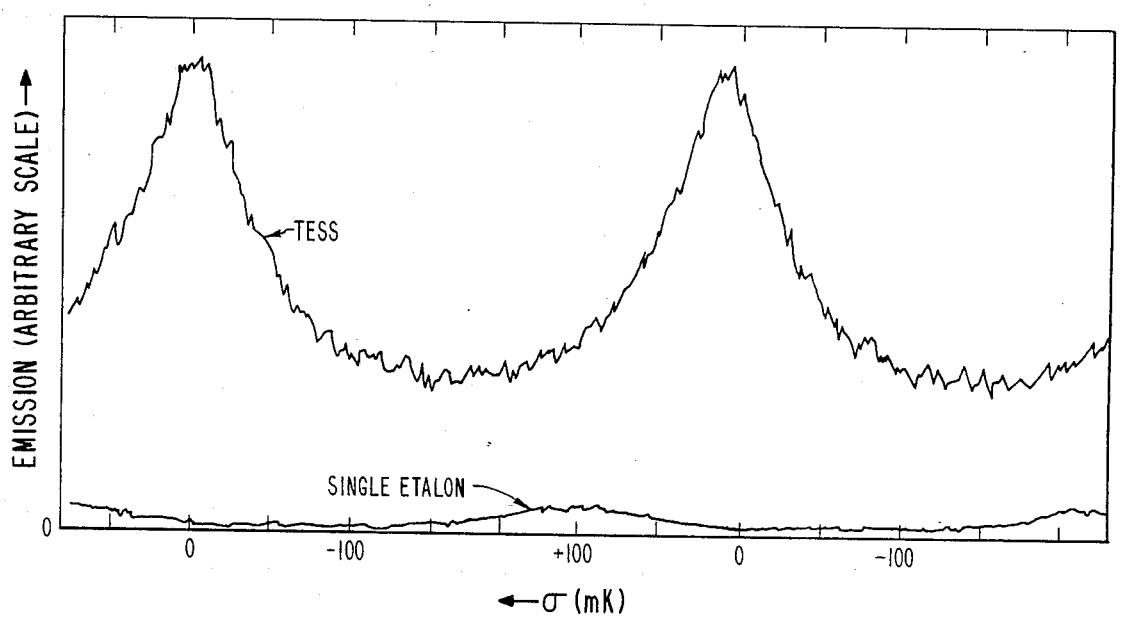
Fig_2
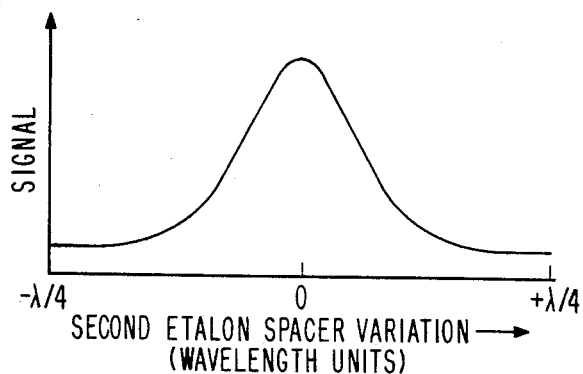
Fig_5

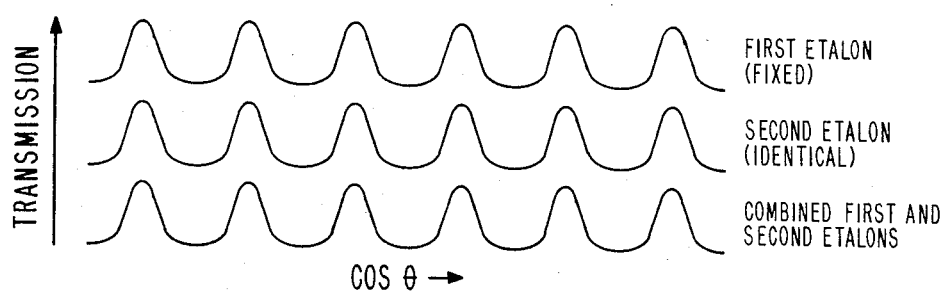
Fig_3a
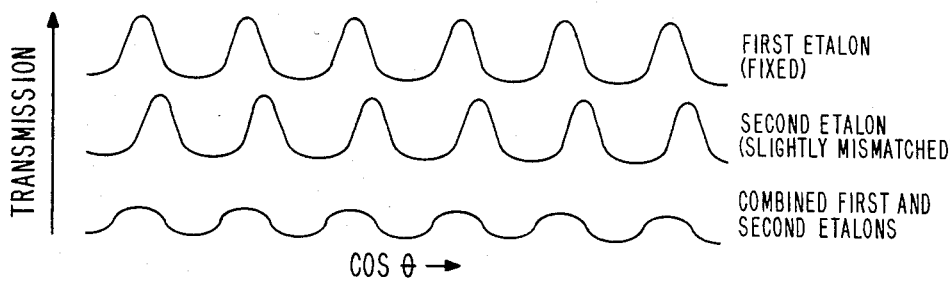
Fig_3b
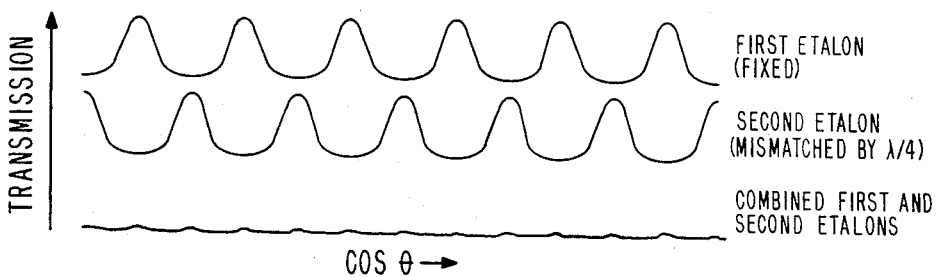
Fig_3c
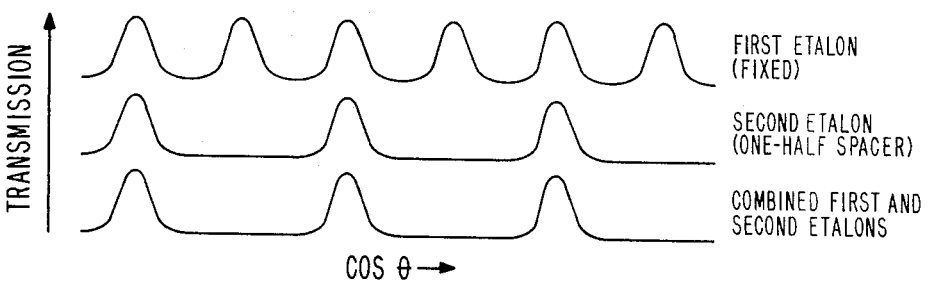
Fig_4a
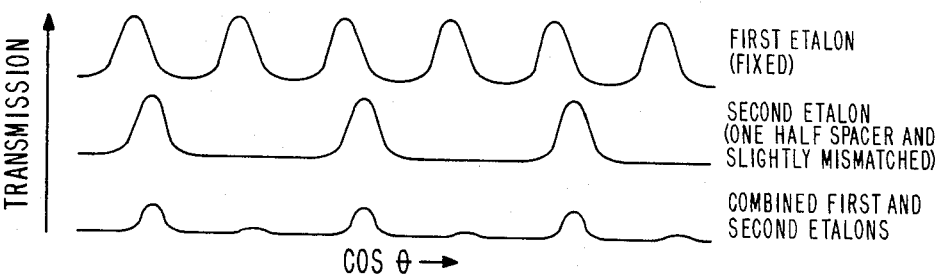
Fig_4b
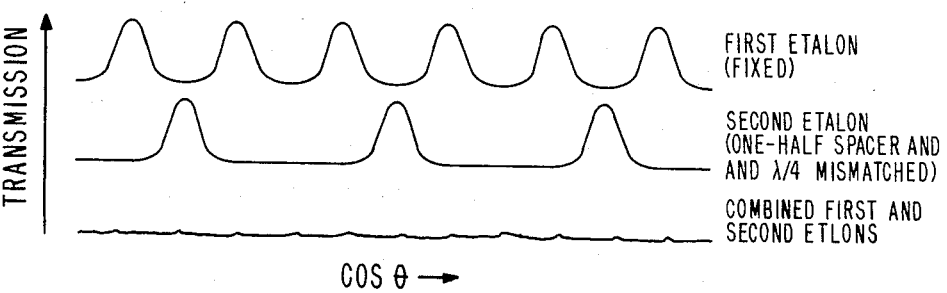
Fig_4c

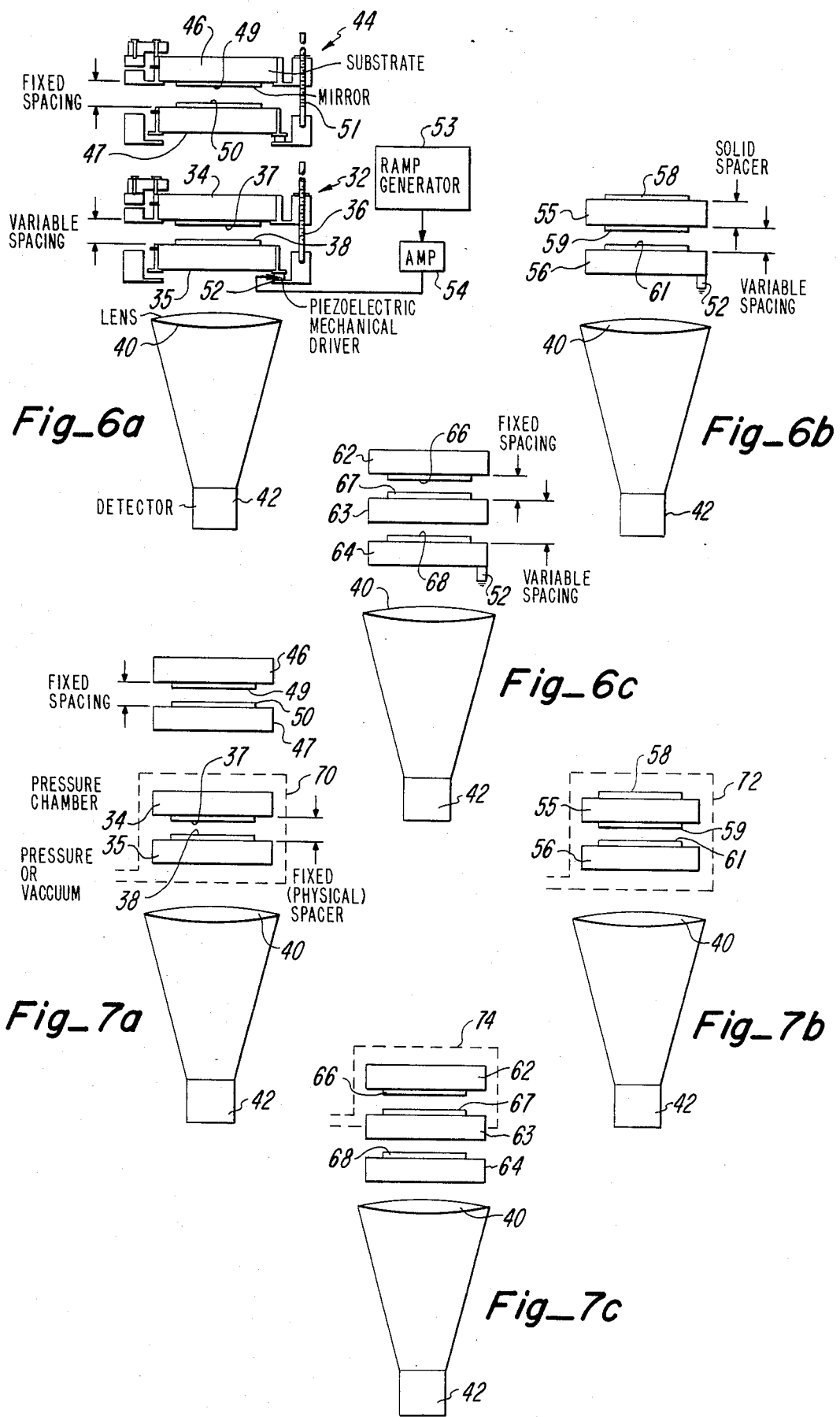

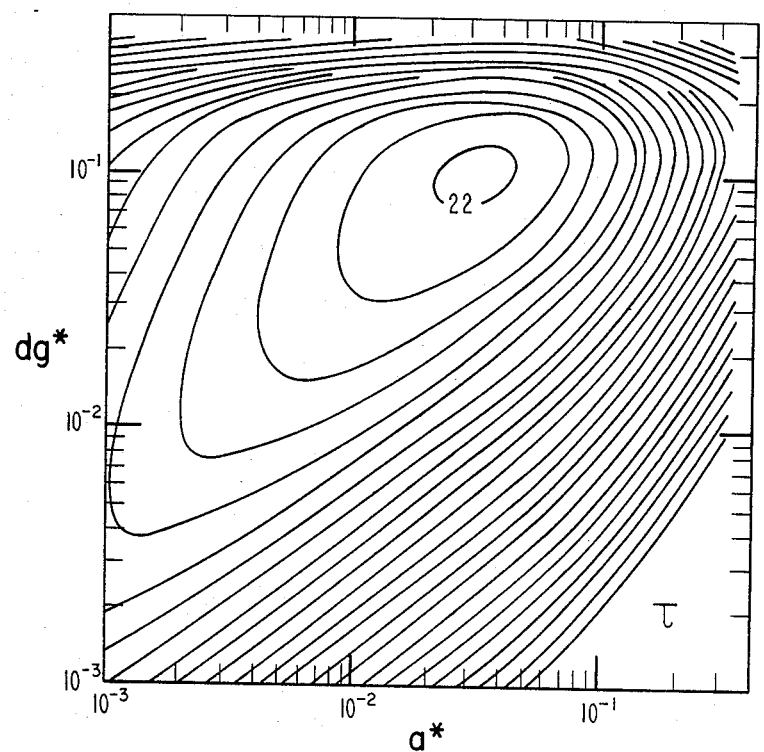
Fig_9
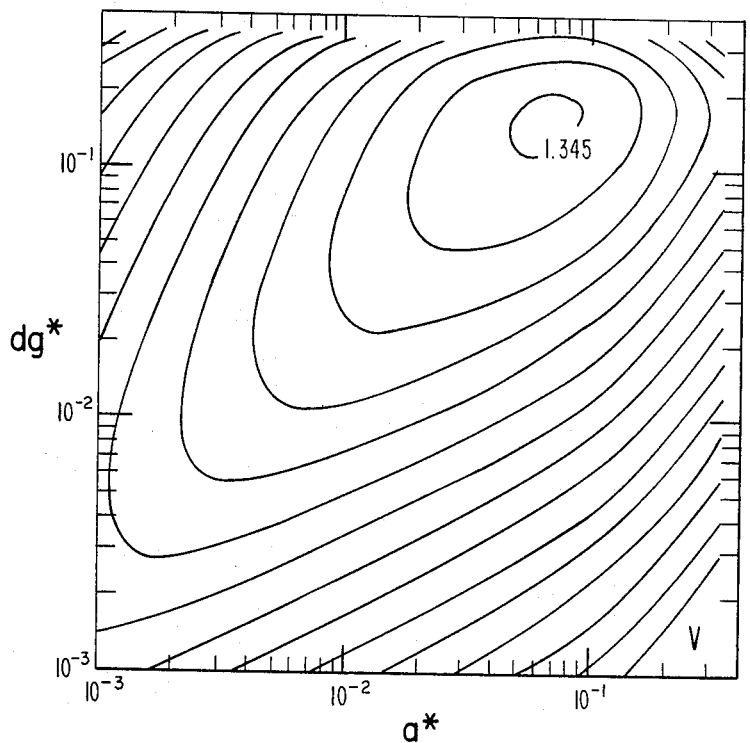
Fig_8

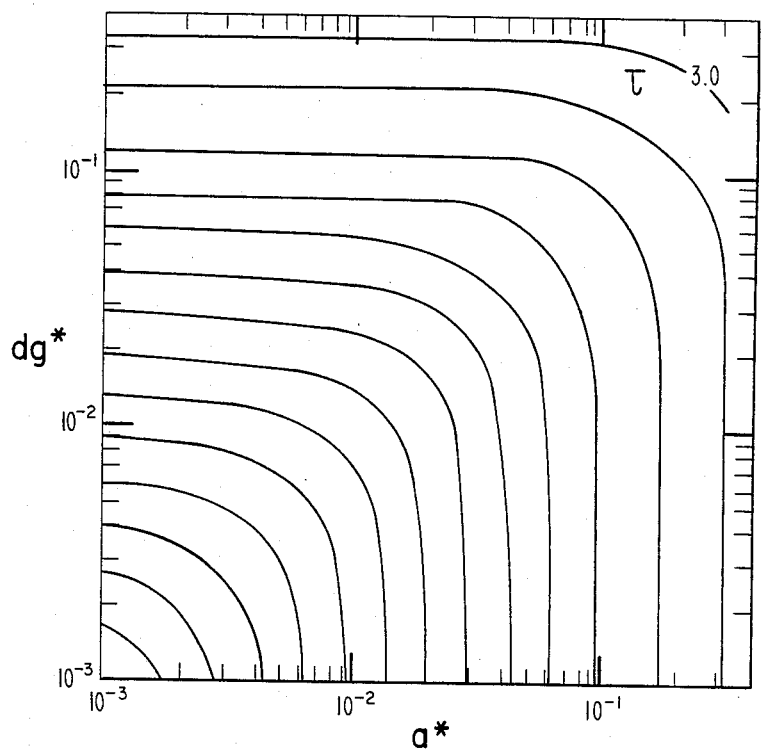
Fig_11
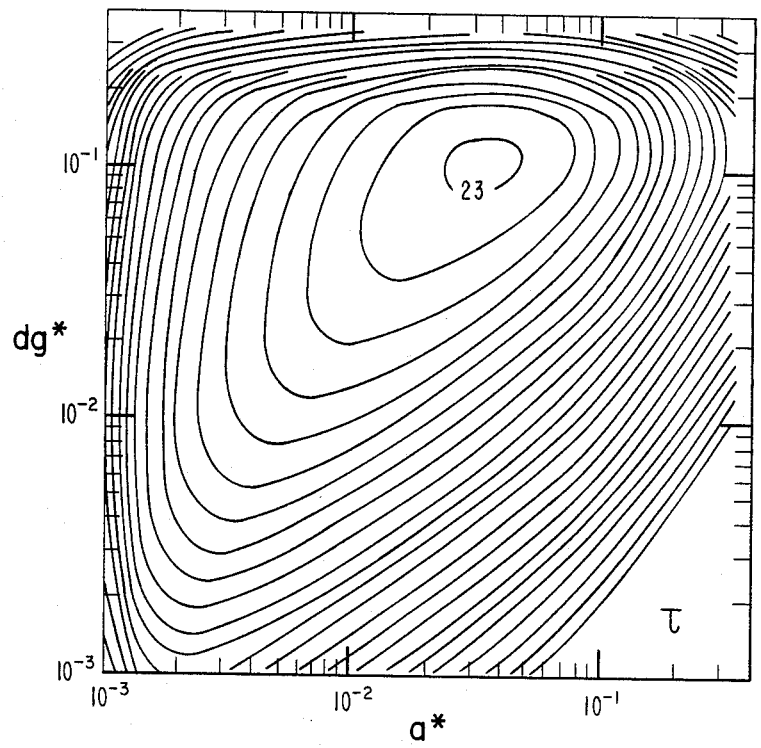
Fig_10

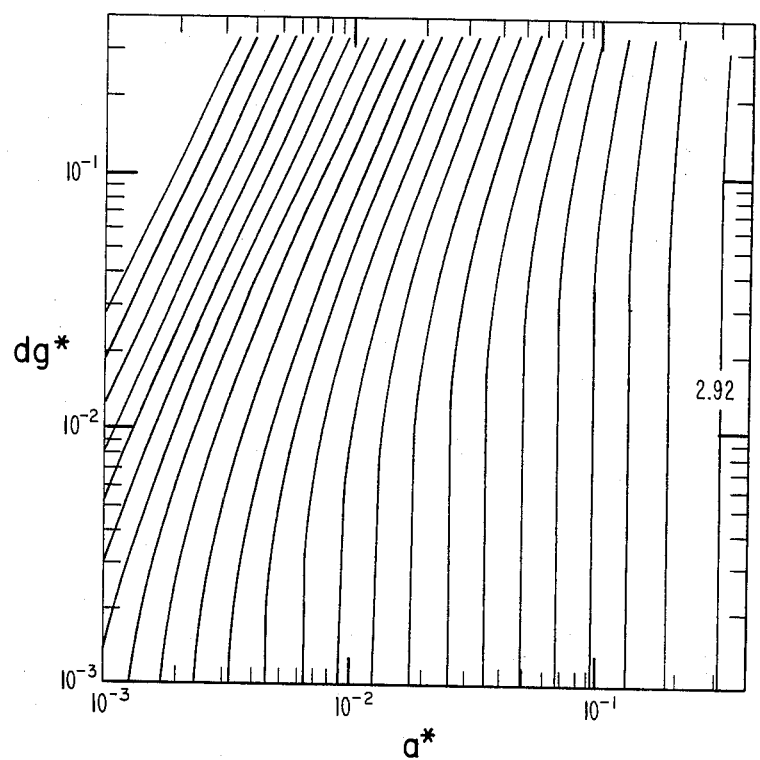
Fig_13
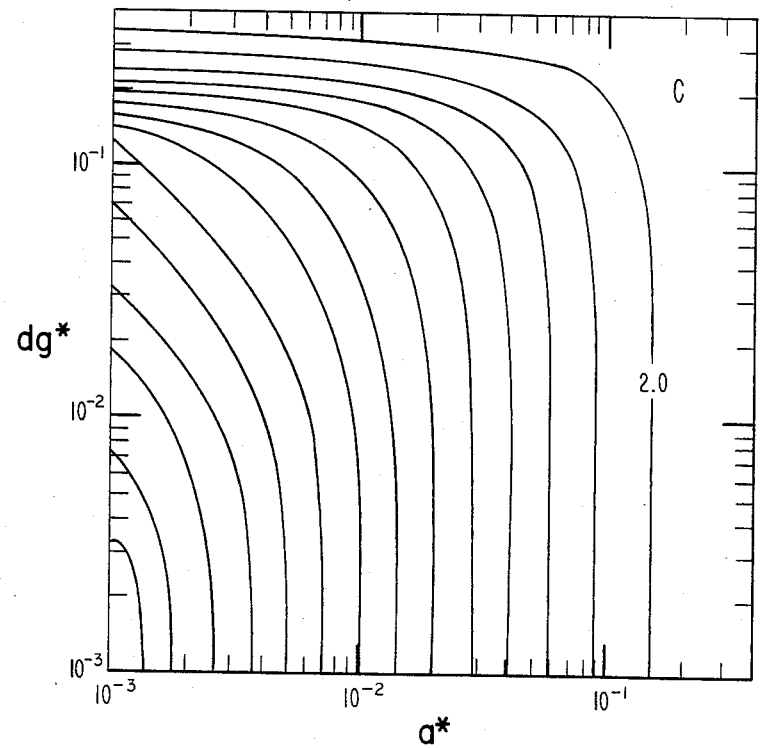
Fig_12

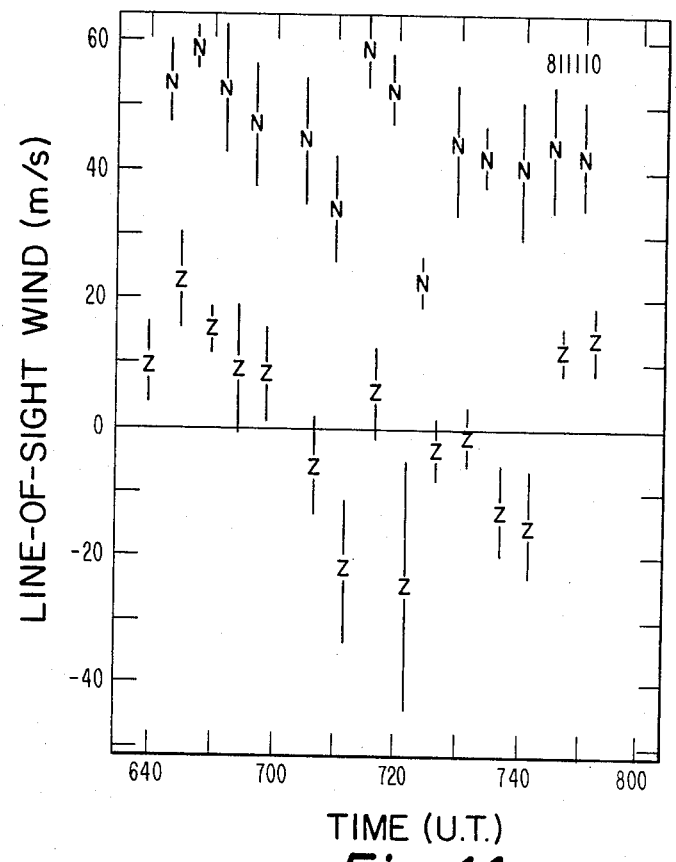
Fig_14
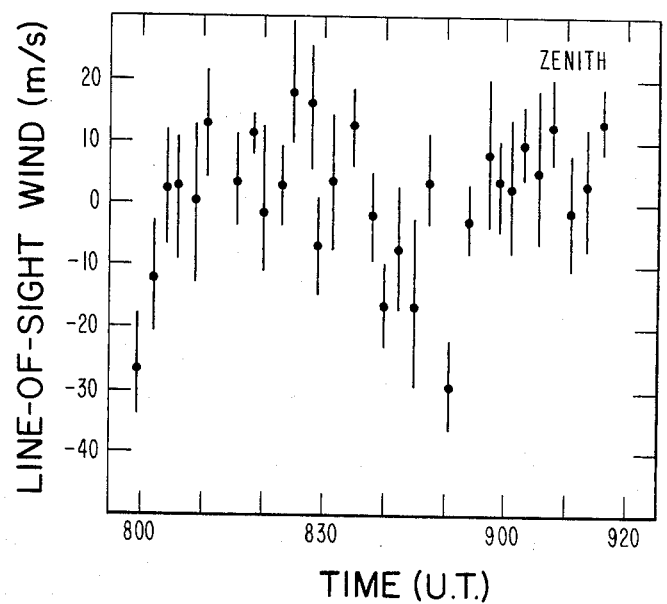
Fig_15

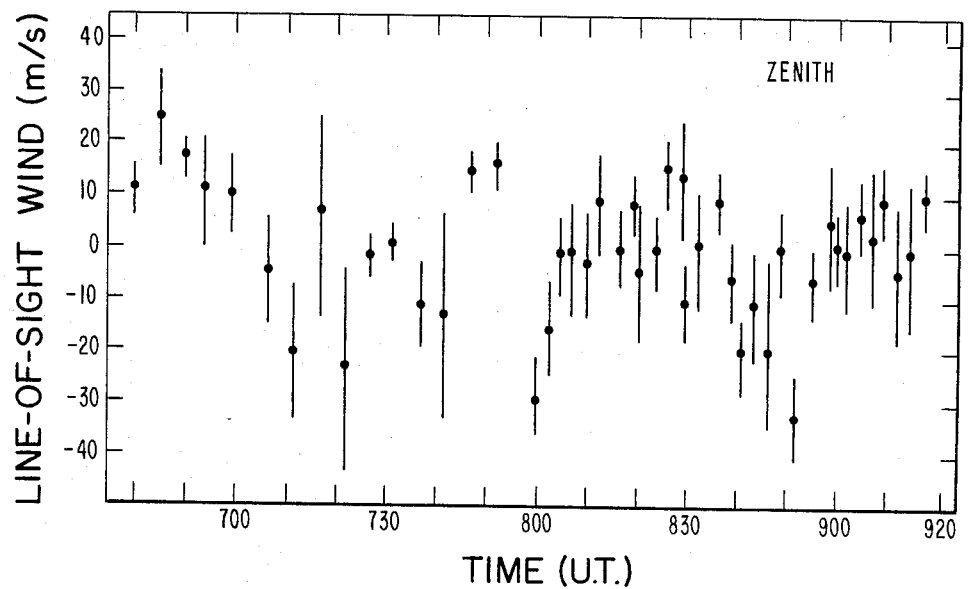
Fig_16
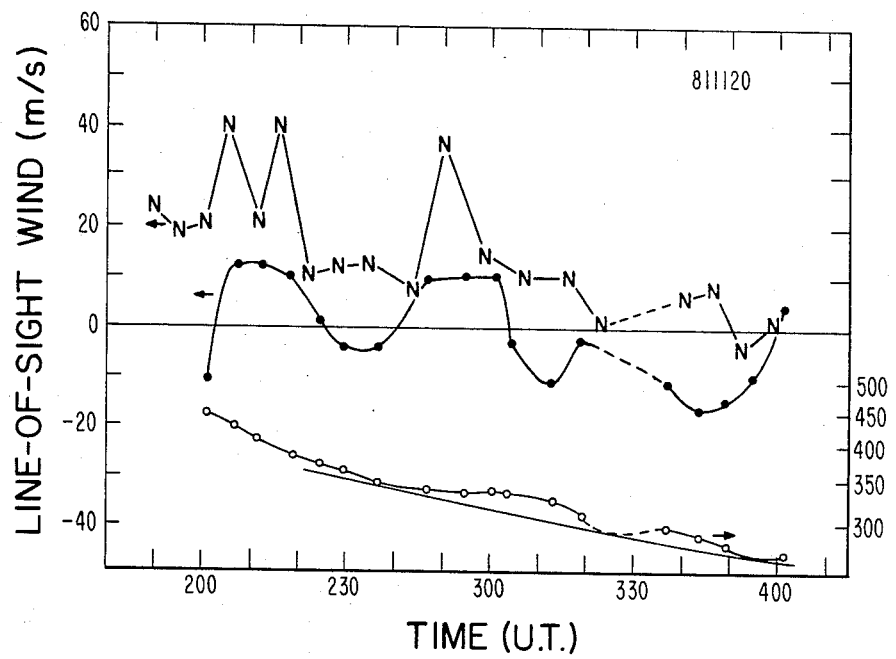
Fig_17

TWIN-ETALON SCANNING SPECTROMETER

FIELD OF THE INVENTION

This invention relates to spectrometry, and, more particularly, relates to scanning spectrometry utilizing twin-etalons.

BACKGROUND OF THE INVENTION

Fabry-Perot photoelectric spectrometers have become widely employed in very-high-resolution studies of (extended) faint sources since this type of spectrometer has been found to have the highest luminosity-resolution product of any device that depends on the interference of light for its operation and has a spectrum as its output.

Two versions of the Fabry-Perot spectrometer exist, namely, the plane, or classical, Fabry-Perot spectrometer (FPP) and the spherical Fabry-Perot spectrometer (FPS). The spherical Fabry-Perot spectrometer has a larger throughput at very high resolution than can be obtained with the plane Fabry-Perot with practical size mirrors (i.e., useful diameters of <150 mm); however, the spherical Fabry-Perot spectrometer has the inherent drawback that once the resolution (i.e., the spacing) is chosen, it cannot be changed except by obtaining a new pair of mirrors. Because the spacing, and therefore the resolution, of a plane Fabry-Perot spectrometer can be changed at will, this instrument is more versatile and this accounts for its wide usage, as opposed to the spherical version (which is normally used only in restricted applications).

The single-aperture plane Fabry-Perot spectrometer is sometimes not sufficiently luminous, however, to obtain measurements of faint sources with (arbitrary) time resolutions, and several schemes have heretofore been devised to increase the luminosity of the instrument. Increased luminosity has been attempted, for example, by replacement of the single aperture with a set of transparent annuli (to thus accept more than one fringe), using insect-eye lenses, measuring a number of elements at the same time using multiplexing techniques, multiple detectors, and/or segmented single detectors that include TV camera tubes.

The increase in luminosity heretofore obtained, however, has been modest, due at least in part, because the precision to which multiple annuli masks can be made limits the number of these annuli in a practical mask, the annuli scheme is useful only very near a fixed wavelength, multiple and segmented detector approaches reach a practical limit after about ten detector/segments due of mechanical and calibration problems, and/or the TV tube approach suffers from limited sensitivity and dynamic range compared with other detectors, such as photomultiplier tubes, for example.

A Fabry-Perot spectrometer is described in my article entitled "Measurement of thermospheric temperatures and winds by remote Fabry-Perot spectrometry", Optical Engineering, Volume 19, No. 4, July/August, 1980, pages 518-532. In addition, the Fabry-Perot interferometer is shown and described, for example, in U.S. Pat. Nos. 4,225,236 and 3,984,190.

The twin-etalon scanning spectrometer, as used in this invention, is described in "TESS: a high-luminosity high-resolution twin-etalon scanning spectrometer", Applied Optics, Volume 20, No. 21, Nov. 1, 1981, pages 3687-3688, and "Analytical description of a Fabry-Perot spectrometer. 7: TESS, a high-luminosity high-resolution twin-etalon scanning spectrometer", Applied Optics, Volume 21, No. 3, Feb. 1, 1982, pages 507-512.

SUMMARY OF THE INVENTION

This invention provides an improved spectrometer and spectrometry method that utilizes twin-etalons and modulation of the incoming radiation from a line emission light source by varying the spacing of one etalon with respect to the other to effect a mismatch of the angles of transmission of the etalons to thereby improve the luminosity and resolution of spectrometry.

It is therefore an object of this invention to provide an improved spectrometer and spectrometry method.

It is another object of this invention to provide an improved spectrometer and spectrometry method utilizing twin-etalons.

It is another object of this invention to provide an improved spectrometer and spectrometry method utilizing spatial modulation.

It is yet another object of this invention to provide an improved spectrometer and spectrometry method utilizing twin-etalons and varying the spacing of the light transmission means of one etalon between maximum and minimum light transmission to thereby modulate the radiation passing through the etalons.

It is still another object of this invention to provide an improved spectrometer and spectrometry method utilizing twin-etalons and varying the spacing of the light transmission means of one etalon between a position where the etalons are identical and a position wherein the light transmission means of one etalon are spaced about $\lambda/4$ with respect to the light transmission means of the other etalon.

With these and other objects in view, which will become apparent to one skilled in the art as the description proceeds, this invention resides in the novel construction, combination, arrangement of parts and method substantially as hereinafter described, and more particularly defined by the appended claims, it being understood that such changes in the precise embodiment of the herein disclosed invention are meant to be included as come within the scope of the claims.

BRIEF DESCRIPTION OF THE DRAWINGS

The accompanying drawings, together with the written specification, illustrate a complete embodiment of the invention according to the best mode so far devised for the practical application of the principles thereof, and in which:

FIG. 1 is a block diagram illustrating the use of twin-etalons in the spectrometer of this invention;

FIG. 2 is a spectra of a neon discharge lamp obtained with a spectrometer according to this invention using 21 fringes, with a spectra obtained with a single-etalon single-aperture spectrometer being shown for reference purposes;

FIGS. 3a, b and c illustrates a series of waveforms showing the effect of varying the spacing of the transmission means of one etalon of a twin-etalon spectrometer;

FIGS. 4a, b and c illustrates a series of waveforms showing the effect of varying the spacing of the transmission means of one etalon of a twin-etalon spectrometer where one of the spacings is an integral multiple of the other;

FIG. 5 is a graph showing collective modulated radiation from a twin-etalon spectrometer with space variations of the transmission means of one etalon between $-\lambda/4$ and $+\lambda/4$;

FIGS. 6a, b and c illustrate partial side-view presentations of a twin-etalon spectrometer utilizing different arrangements for controlling space variations of the etalons of the transmission means of one etalon for mechanical scanning;

FIGS. 7a, b and c are partial side-view presentations of a twin-etalon spectrometer illustrating different arrangements for effecting variations of the transmission media of one of the etalons for index of refraction scanning;

FIG. 8 illustrates the ratio of the standard deviation of line position to the width of the source for a twin-etalon scanning spectrometer (TESS) profile measurement (unit area etalon operating at unity detection efficiency at the first order examining a unity emission rate line profile) as a function of source and single-etalon widths normalized to the free spectral range (uncertainty contours are given in units of $10^9$ m sec$^{-1}$ and increase by a factor of $(2)^{\frac{1}{2}}$ beginning with the labeled contour);

FIG. 9 illustrates the ratio of the standard deviation of the temperature to the temperature for a twin-etalon scanning spectrometer profile measurement (unit area etalon operating at unit detection efficiency at the first order examining a unity emission rate line profile) as the function of source and single-etalon widths normalized to the free spectral range (uncertainty contours increase by a factor of $(2)^{\frac{1}{2}}$ beginning with the labeled contour);

FIG. 10 illustrates the ratio in the same manner as FIG. 9 except for the inclusion of 0.005 absorption to the etalon coatings;

FIG. 11 illustrates the number of coefficients necessary to determine fully both the temperature and position of a line source as a function of the source and single-etalon widths normalized to the free spectral range (contours increase by a factor of $(2)^{\frac{1}{2}}$ beginning with the labeled contour);

FIG. 12 illustrates the contrast of twin-etalon scanning spectrometer profiles as a function of source and single-etalon width normalized to the free spectral range (contours increase by factors of 2 beginning with the labeled contour);

FIG. 13 illustrates twin-etalon scanning spectrometer profile peak flux as a function of the source and single-etalon widths normalized to the free spectral range (unit area etalon operating at unity detection efficiency at the first order examining a unity emission rate line profile), with no absorption included (contours increased by a factor of $(2)^{\frac{1}{2}}$ beginning with the labeled contour);

FIG. 14 illustrates vertical (Z) and horizontal (N) line-of-sight motions of the neutral thermosphere with positive values of the motion indicating equatorward and downward motion, respectively;

FIG. 15 illustrates vertical line-of-sight motions of the neutral thermosphere (same date as FIG. 14 illustration);

FIG. 16 illustrates combined vertical motion of FIGS. 14 and 15; and

FIG. 17 is a presentation equivalent to that of FIG. 14 (except for the date that the information was obtained and with errors omitted and vertical motions indicated by dots for the sake of clarity).

DESCRIPTION OF THE INVENTION

The twin-etalon spectrometer of this invention is shown in block form in FIG. 1. As shown, a line emission light source 20 directs radiation continuously toward mirrors 22 and 23 (mirrors 22 and 23 each consist of two light transmission means, or elements, as brought out hereinafter to thus serve as twin-etalons) which act to modulate the light (radiation) from source 20 by causing the spacing of the transmission means of mirror 23 to be varied by spacing control 25. The modulated radiation passing through the twin-etalons 22 and 23 is collected at detector 27 and, after conventional processing, a display is presented at indicator 29.

As brought out hereinabove, the Fabry-Perot spectrometer is well known, and this invention is an improvement thereto. Thus, only those portions deemed necessary or desirable for describing the invention have been set forth in detail herein. The background section of this application lists several references to such spectrometers, as well articles directed to the twin-etalon spectrometer of this invention, all of which are hereby incorporated herein by reference.

An ideal plane Fabry-Perot etalon when illuminated on one side at all angles with a (monochromatic) line source, will transmit this line at specific angles according to the usual and established relationship $$n = 2\mu t \sigma \cos \theta \quad (1)$$

where $\theta$ is the angle of the light, $\sigma$ is the frequency (i.e., inverse wavelength) of the light, t is the etalon spacer or mirror spacing, $\mu$ is the index of refraction of the material between the mirrors and n is the order number which at integer value (but less than or equal to $n_o = 2\mu t \sigma$) indicates maximum transmission (i.e., gives rise to the specific angles referred to above).

By placing an identical second etalon on the exit side of the first, the line emission of the second etalon will be transmitted at the same (specific) angles as that of the first etalon. However, when the spacing of the transmission means of the second etalon is changed relative to that of the transmission means of the first etalon (mechanically or optically) (i.e., the product $\mu t$ is changed), the angles of transmission of the two etalons will be mismatched (i.e., the specific angles of transmission are different) and the transmission of the incident line emission will be decreased until it reaches a minimum when a one-half order (or $\lambda/4$ change) in the spacing is effected. Since the system is symmetric, the same effect is obtained if the first etalon spacing is changed while the second etalon spacing is fixed.

The ability to modulate the transmission of the incident line emission for all of the specific angles makes it possible to use the flux of many fringes to thus increase the luminosity of the twin-etalon spectrometer of this invention by large values when compared with the single-aperture Fabry-Perot spectrometer.

Since the mathematical operation that represents the above operation is convolution, the behavior of the twin-etalon scanning spectrometer device can be explored by taking the standard expression for an etalon:

$$\epsilon_i = [1 - A_i(1-R_i)^{-1}]^2(1-R_1)^2(1-2R_i \cos \chi + R_i^2)^{-1} \quad (2)$$

where $A_i$ is the absorptivity of the etalon coatings which have reflectivity $R_i$, and $\chi$ is proportional to the frequency (inverse wavelength), and carrying out the convolution operation, i.e., $$Y_{TESS} = \xi_1 * \xi_2 = \quad (3)$$

-continued
$$[1 - A_1(1 - R_1)^{-1}]^2[1 - A_2(1 - R_2)^{-1}]^2 \times$$
$$(1 - R_1^2 R_2^2)(1 - R_1)(1 - R_2) \times$$
$$(1 + R_1)^{-1}(1 + R_2)^{-1}(1 - 2R_1R_2\cos\chi + R_1^2R_2^2)^{-1}$$

The results of Equation 3 show that the combined two etalons of the twin-etalon scanning spectrometer behave as a single etalon of effective reflectivity $R_e = R_1 \cdot R_2$ but with lower effective transmission than the single etalon. From this ideal case, it is possible to go to the real world of arbitrary line shapes with finite widths, as well as imperfect etalon mirrors and coatings, since the problem reduces to the previous treatment of the single-etalon single-aperture Fabry-Perot device. It might be noted that the same result of Equation 3 can be obtained by cross-correlation because of the symmetry of the functions.

The detailed theory shows that for a line source of arbitrary shape and normalized width (normalized to the free spectral range), optimum reflectivity and linewidths exist at which the uncertainties of determination of the line breadth and line shifts are at a minimum. Comparing the fluxes transmitted by the twin-etalon spectrometer at the minimum uncertainty points with the flux from a single-aperture single-etalon spectrometer of the same physical size at its minimum uncertainty points, it was found that a gain of ~0.64 per fringe can be obtained for the double etalon relative to the single etalon. Therefore, a total gain of 0.64 m can be expected if m fringes are utilized.

A working model of a twin-etalon scanning spectrometer (TESS) was built utilizing a piezoelectric drive for mechanical scanning (as brought out hereinafter). This spectrometer was compared with a single-etalon single-aperture and the results of this comparison are shown in FIG. 2. The experimentally deduced gain is ~13.6, for 21 fringes, which is in good agreement with the expected gain of 13.4. The measurements were taken for a neon discharge lamp with the two (150-mm diameter) etalons at 15-mm nominal spacing, and the choice of 21 fringes was dictated by mechanical constraints to make the comparisons possible with the same setup and with a minimum of delay. The single-etalon and TESS profiles are not at the same location in the scan as shown in FIG. 2, which in the usual case in the system of this invention using a fixed first etalon and a scanning second etalon, since absolute position of the fringes is not controlled (only relative alignments need be controlled).

In the working model, the attainment of equal spacing of the two etalons was carried out by first setting the scanning etalon at some nominal spacing (15 mm for the results of FIG. 2), then setting the fixed etalon at this nominal spacing, and finally trimming the latter visually. The observed properties at equal spacing are complete illumination of the field which consists of a set of fringes of the fixed etalon, and this illumination is spatially modulated as the second etalon scans. Small departures from equal spacing are observed as rings of luminosity that move in and out of the center of the field as the lower etalon scans. The effect of the surface defects of the flats ($N_D \approx 40$) is observable as fine graininess in the illumination.

While one etalon was arbitrarily fixed with the second performing the scanning in the working model, the same results can be obtained if both etalons are scanned since only their relative difference in the rate of scanning is important. In addition, if only the central-order is to be selected for study, a multi-etalon spectrometer can be realized as a special case of a twin-etalon spectrometer. This can be accomplished by placing an aperture in the same manner as does the single-etalon single-aperture spectrometer making the maximum transmission peaks overlap, and the scanning rate of the etalons equal in frequency units while removing the equal etalon spacer limitation.

The typical waveforms of FIGS. 3a, b and c illustrate transmission through the twin-etalons with each etalon output being shown as a function of $\cos\theta$, as well as their combined transmission as the spacer of the second etalon is changed from identical to the first up to a $\lambda/4$ different spacing. As can be seen from FIG. 3, the incoming light source is being modulated (i.e., varying from a maximum to a minimum). A less efficient, but still useful, way to attain modulation can be achieved if one of the spacers is an integer multiple of the other as shown by the typical waveforms of FIGS. 4a, b and c.

If all of the radiation being modulated is then collected with a detector, a signal, such as typically shown in FIG. 5, is obtained and this signal is shown as a function of the second etalon spacer variation from being identical with the first to a total mismatch of $\lambda/4$. If the line emission intensity is assumed to be S and the peak transmission through the two etalons to be $\tau$ for each peak, the peak signal for each fringe is $S\tau$, and the total peak signal when m fringes are collected in the twin-etalon scanning spectrometer device detector is $mS\tau$. It should be noted that this modulation is very specific in which it preserves the line emission width, position and intensity information in comparison with, for example, a simple on-and-off mechanical chopper.

Various arrangements for constructing the twin-etalon scanning spectrometer (TESS) are shown in FIGS. 6a, b and c for mechanical scanning. As shown in FIG. 6a (the now preferred embodiment), etalon mount 32, consisting of substrates 34 and 35 includes spacing control screw 36 so that the spacing between the substrates can be carefully controlled. As shown in FIG. 6a, substrates 34 and 35 have mirrors 37 and 38 mounted (or coated) thereon, with the mirrors being positioned adjacent to lens 40 which is in turn adjacent to detector 42. Mirrors 37 and 38 are semitransparent (as are all of the mirrors discussed herein) and while a lens 40 is shown, it is to be realized that the lens is not necessary for the general application. However, to obtain selective spatial resolution, the use of a focusing device (such as a lens) will allow one-to-one correspondence between a detector and an object, thus enabling measurement of many separate objects by individual detectors (or a single detector capable of multiple image detector (such as a television tube, for example) simultaneously.

Etalon mount 44, consisting of substrates 46 and 47 having mirrors 49 and 50 mounted (or coated) thereon, is positioned adjacent to and forwardly of etalon mount 32 so that the incoming light is received and passed through the mirrors of both etalons and through the lens to the detector (i.e., the etalons are aligned and in series with one another). As shown in FIG. 6a, the relative positioning of substrates 46 and 47 is controlled by spacing control screw 51 which allows initial adjustment of the spacer.

A piezoelectric mechanical drive element 52 is provided to vary the spacing between substrates 34 and 35 (and hence to change the spacing between the light transmission elements, or mirrors, 37 and 38). By controlling the piezoelectric element, as for example, by a ramp generator 53 connected with piezoelectric element 52 through amplifier 54, the piezoelectric element varies the spacing between the transmission means (i.e., mirrors 37 and 38) of the rearwardly positioned etalon.

FIG. 6b illustrates an alternate embodiment of the twin-etalon spectrometer wherein only two substrates 55 and 56 are utilized. As shown, substrate 55 has mirrors 58 and 59 mounted (or coated) at opposite sides to provide a fixed spacing therebetween while substrate 56 has a single mirror 61 mounted thereon with piezoelectric mechanical driver 52 being connected to substrate 56 to provide variable spacing between mirrors 59 and 61. Positioning of the substrates, as well as varying the positioning between the mirrors can be effected in the same manner as described hereinabove with respect to FIG. 6a.

FIG. 6c illustrate another alternate embodiment of the twin-etalon spectrometer wherein three substrate 62, 63 and 64 are utilized, each of which has a single mirror 66, 67 and 68, respectively mounted (or coated) thereon, with piezoelectric mechanical driver 52 being connected to substrate 64. Again, the relative positioning between the substrates can be effected in the same manner as described hereinabove with respect to FIG. 6a.

FIG. 7a, b and c shows equivalent arrangements for controlling a twin-etalon scanning spectrometer (TESS) for index of refraction scanning, rather than mechanical scanning. As shown in FIGS. 7a, b and c, the twin-etalon devices are structurally similar to those shown in FIGS. 6a, b and c, respectively, except for providing a pressure chamber 70 around substrates 34 and 35 (FIG. 7a), a pressure chamber 72 around substrates 55 and 56 (FIG. 7b), and a pressure chamber 74 around substrate 62 and the forward half of substrate 63 (FIG. 7c) in lieu of the piezoelectric mechanical driver 52 as shown in FIGS. 6a, b and c. By application of pressure (or vacuum) to the pressure chambers, the effective spacing between the transmission elements within the pressure chamber is varied in the same manner as mechanically achieved by the mechanical driver as shown in FIGS. 6a, b and c.

The twin-etalon scanning spectrometer device is different from the conventional Fabry-Perot device in that the latter uses a small aperture (smaller than the peak-to-peak distance of the fringes schematically shown in FIG. 3), and the fringe pattern is allowed to scan across the aperture. Thus, at most, one peak is used in the conventional Fabry-Perot device while in the twin-etalon scanning spectrometer a very large number, (i.e., $n_o = 2\mu t\sigma$ or order number) is utilized. To give an idea of the numbers involved, consider a line emission at 5000 angstroms ($\sigma = 20000$ cm$^{-1}$) at an optical spacing $\mu t = 2.5$ cm; then the value of $n_o = 100,000$, that is to say a (theoretical) signal increase of 5 orders of magnitude is possible.

As brought out hereinabove, the twin-etalon scanning spectrometer consists of two etalons in series. If the first etalon is illuminated by a (monochromatic) line source at all angles, this etalon will transmit this line at predetermined specific angles which depend only on the etalon spacing and the frequency (inverse wavelength) of the radiation. When the second etalon is placed on the exit side of the first, if it is identical to the first etalon, it will transmit the radiation at the same specific angles as the first etalon. If either of the transmission means of an etalon is changed with respect to the other (by mechanical or optical means), however, the angles of transmission will be mismatched with respect to each other, and thus the transmission of the incident light will decrease until it reaches a minimum when a one-half order, or $\lambda/4$, change in the transmission means spacing is reached. In effect, this ability to modulate the transmission of the incident radiation for all the specific angles makes it feasible to use the flux of many fringes, and thus the luminosity of the twin-etalon scanning spectrometer can be very large when compared with the single-etalon single-aperture Fabry-Perot device.

A Doppler profile of temperature $\tau$ and corresponding normalized halfwidth at half-height dg* (normalized to the free spectral range or periodicity of the Fabry-Perot spectrometer) and etalons, each of reflectivity R, with their associated normalized width a* will be considered in the following discussion. Note that a Voigt profile is implicitly discussed since a Lorentzian profile is included in the derivations as an effective reflectivity. The main difference from the previous results is the absence of an aperture function, which in the present formalism can be introduced as an aperture of normalized width of 0.5, that is, one free spectral range total width, and thus automatically consider the twin-etalon scanning spectrometer behavior over one free spectral range only.

The variances ($o^2$) of determination of winds (Doppler shifts) and temperature (Doppler widths) are $$o_v^2 Q A \epsilon n_0 (dg^*)^{-2} = \tag{4}$$

$$\left[ 16\pi^3 c^{-2} (dg^*)^2 [1 - A_1(1 - R_1)^{-1}]^2 \times [1 - A_2(1 - R_2)^{-1}]^2 \times \right.$$

$$\left. (1 - R_1)(1 - R_2)(1 + R_1)^{-1}(1 + R_2)^{-1} \times \left( \sum_{n=1}^{N} u_n \right) \right]^{-1},$$

$$o_\tau^2 Q A \epsilon (\tau^2 n_0)^{-1} = \tag{5}$$

$$\left\{ 4\pi^5 (dg^*)^4 (\ln 2)^{-2} [1 - A_1(1 - R_1)^{-1}]^2 \times [1 - A_2(1 - R_2)^{-1}]^2 \times \right.$$

$$(1 - R_1)(1 - R_2)(1 + R_1)^{-1}(1 + R_2)^{-1} \times$$

$$\left. \left[ \sum_{n=1}^{N} n^4 \omega_n - \left( \sum_{n=1}^{N} n^2 \omega_n \right)^2 \left( \sum_{n=1}^{N} \omega_n \right)^{-1} \right]^{-1} \right\}$$

In the above expressions, $A_i$ and $R_i$ have the same meaning as in Equation 4, c is the speed of light, and $u_i$ and $\omega_i$ have the same meanings stated in earlier publications, namely, $$U_n = a_n^2 n^2 (1 - a_{2n})^{-1}, \tag{6}$$

$$u_n' = a_n^2 (1 + a_{2n})^{-1},$$

$$a_n = d_n \exp(-n^2 \sqrt{\tau}),$$

$$d_n = R_1^n R_2^n \operatorname{sinc}(2ndf_1^*) \operatorname{sinc}(2ndf_2^*) \times$$

$$\exp(-n^2 G_1^2 4^{-1}) \exp(-n^2 G_2^2 4^{-1}).$$

The $d_n$ are the coefficients that define the instrumental function, and the $a_n$ are those that define the measurement, i.e., the convolution of the source and instrument. The upper limit of the summations in Equation 4 and 5 is ∞ for the theoretical case and some value N for the practical case, which is the number of terms at which the summation terms in Equations 4 and 5 converge (to some arbitrary criterion). The significance of the value of N for a given case is that it represents the minimum number of coefficients necessary to determine unambiguously both the variances of determination (of temperature and wind) and, by definition, the temperature and winds themselves. Thus, the number N defines the critical sampling interval by the relation $(2N)^{-1}$; i.e., 2N equidistant samples are required to describe fully the information in the spectrum (one free spectral range) under consideration. Note that the right-hand side of both Equations 4 and 5 is the normalized variance of determination, that is, normalized-to-unit-area etalons examining a unit-area-emission rate Q source at unity quantum efficiency $\epsilon$; it is thus of general applicability. The units of Equation 4 are those of the velocity of light c to the second power, while Equation 5 is dimensionless. To reduce the left-hand side of Equations 4 and 5 to a given specific case the units of Q are usually expressed in photons $(cm^2 sec\, sr)^{-1}$, in $cm^2$, and $\epsilon$ is dimensionless, but with a value of $\leq 1$.

The numerical calculations on the right-hand sides of Equations 4 and 5 are given in FIGS. 8, 9 and 10; the results are expressed in terms of the square root of the expressions, or standard deviation, rather than the variance of the expressions, to be consistent with the figures shown in the earlier reports on the single-etalon plane Fabry-Perot device.

In these FIGURES, as well as in other figures that use the normalized line source width (dg*) as the ordinate and the etalon normalized width (a*) as the abscissa, the meaning of a* is restricted to be the value of a* of each (identical) etalon, not the combined value of both etalons. For the case where the reflectivities of both etalons are not identical, a* is to be interpreted as that value obtained from the effective reflectivity; i.e., $R_e = (R_1 R_2)^{\frac{1}{2}}$.

FIG. 8 shows contours of the ratio of the normalized uncertainties of determination of the Doppler shifts, or winds, over the normalized line source width as a function of line source and (single)-etalon width. The contours are separated by factors of $(2)^{\frac{1}{2}}$, and only the lowest value is labeled. The unit of the contours in FIG. 8 is $10^9$ m $sec^{-1}$.

FIGS. 9 and 10 give the contours of the normalized uncertainties of determination of temperatures expressed as the ratio of uncertainty of temperature determination over the temperature. Again these (dimensionless) contours are separated by factors of $(2)^{\frac{1}{2}}$, and only the lowest value is labeled. The difference between FIGS. 9 and 10 is the presence of 0.005 absorptivity in the latter. The presence of absorption is more noticeable at small values of a*, as expected, since at the associated high reflectivities the loss of transmission due to this absorption is appreciable.

Near the minimum uncertainty value, or optimum point of operation, the effect of absorption is small, i.e., <5% increase in the uncertainty. Absorptivity will not be considered further since it is presumed that operation is desired near the optimum region, where, as we have seen, its effect is negligible. The optimum values of a* and dg* to obtain minimum uncertainties of determination of temperatures and [winds] are a*=0.0324[0.075] and dg*=0.106[0.159], and the associated values for the finesse and reflectivity of each etalon are 15.4[6.7] and 0.816[0.63], respectively.

The results presented above are nearly indistinguishable from those obtained earlier for the single-etalon plane Fabry-Perot device, which is rather convenient since the same etalons can be used for either the plane Fabry-Perot device or the twin-etalon scanning spectrometer and be very close to optimum for both. Since the etalons in the twin-etalon scanning spectrometer can satisfy only one optimum point of operation for a given case, FIGS. 8 and 10 show that a better compromise is made if the etalons are optimized for temperature since the uncertainty of wind will increase by a factor of <1.26 from the optimum, but, if the etalons are optimized for wind measurements, the uncertainties of the temperature will increase by nearly a factor of 1.5.

FIG. 11 shows the minimum number of coefficients necessary to determine unambiguously the information in the spectrum and thus a measure of the minimum number of equidistant samples of the spectrum to fulfill this requirement. For the optimum, or least uncertainty value point, determination of temperature and winds, the minimum number of coefficients is 7 and 4, respectively. These results are the same as those obtained for the (optimum) single etalon, therefore, 14 and 8 samples of the spectrum are the minimum number needed to fully describe it if either temperature or winds are desired.

FIGS. 12 and 13 give results for subsidiary quantities that provides further information. FIG. 12 gives the contrast, or ratio of the fringes maxima to fringe minima, with the contours separated by a factor of (2) and where the optimum points of operation are found to lie at contrasts of about 12 and 4, respectively. FIG. 13 shows the normalized flux F at the fringe peak, defined as $$F_{n0}(AQ\epsilon)^{-1} = 2\pi(1-R_1)(1-R_2)(1+R_1)^{-1}(1+R_2)^{-1} \times \quad (7)$$

$$\left(1 + 2 \sum_{n=1}^{N} a_n\right),$$

which gives a measure of the fraction of the incident flux transmitted at the peak. The transmission of the instrument can be easily calculated if the normalized flux of FIG. 13 is multiplied by $(1-R^2)(1+R)^2(1+R^2)^{-1}(1-R)^{-2}2\pi$ for $R=(R_1R_2)^{\frac{1}{2}}$.

The results presented herein show a striking similarity to the results obtained for the single-etalon single-aperture plane Fabry-Perot spectrometer. The results given in FIGS. 8 to 10 show that the twin-etalon scanning spectrometer uncertainties are 1.54 times larger than those of the single-etalon single-aperture, with both at their optimum conditions. At first, this appears to be a loss over the single-etalon instrument; however, these results for the twin-etalon scanning spectrometer are for one fringe, or more correctly, one free spectral range. As discussed earlier, with the twin-etalon spectrometer it is possible to use many fringes. Thus the twin-etalon scanning spectrometer is more luminous than a single-etalon single-aperture spectrometer.

The definition of gain of the twin-etalon scanning spectrometer relative to the single-etalon single-aperture Fabry-Perot device can be based on either luminosity or uncertainty considerations. The gain in luminosity is conveniently obtained as the ratio of the flux transmitted by the two instruments over one free spectral range. This choice has been made because it is only dependent on the reflectivity of the etalon(s). For optimum points of operation, the luminosity gains are 0.78 and 3.77 for temperature and wind determinations, respectively. For the prototype twin-etalon scanning spectrometer, the luminosity gain is ~0.64 because of the less than optimum reflectivities of the etalons used.

Gain can also be defined as the ratio of the time necessary to obtain the same uncertainties of determination for a given measurement with twin-etalon scanning spectrometer relative to an optimized single-etalon single-aperture plane Fabry-Perot device. The result for both temperature and wind determinations is a gain of 0.42. Since this definition of gain is most practical for use, it is the only gain considered.

The upper limit of gain is given by the theoretical case of two perfectly identical infinitely large and infinitely close etalons, where, when set at the exact same spacing, all the fringes can be utilized. Thus, the maximum gain is the order number of the etalons times the free spectral range i.e., $0.42n_0$.

Since, for successful operation, the twin-etalon scanning spectrometer must be scanned, the proper choice of the scanning region maintains the large theoretical gain, and this is accomplished if the fixed etalon is at $n_0$ and the scanning etalon scans from $(n_0-\frac{1}{2})$ to $(n_0+\frac{1}{2})$. By this scheme, a full order is scanned from minimum to minimum. The other possibility of scanning, from $n_0$ to $(n_0 \pm 1)$, where the scan is from maximum to maximum of the fringes, is limited by the fact that the two etalons are different by 1 order.

In a pictorial way, it can be said that one etalon has one more ring than the other leading to the unavoidable mismatch of the instrumental profile as well. However, if an arbitrary mismatch of the fringes is admitted leading to an acceptable increase in the uncertainties, it is possible to still use a large number of fringes starting from the central order. Quantitatively, if all the fringes away from the central order are accepted until an arbitrary mismatch of a fraction $\delta$ of a fringe is reached, it can be easily shown that the number of usable fringes K is given by $K=\delta n_0$. Note that the number of acceptable rings increases with $n_0$, i.e., the resolution. For example, the number of acceptable rings K for a 1.5-cm spacer twin-etalon scanning spectrometer, such as that described earlier and assuming a mismatch at the Kth ring of 0.01 orders, is about 476, or a gain over the single-etalon spectrometer of ~200.

As earlier mentioned, the optimum conditions for the twin-etalon scanning spectrometer and the single-etalon device are essentially the same in regard to both the finesse of each etalon $[N_R=(2a^*)^{-1}]$ and the source width to obtain the optimum, or minimum uncertainty, operation, except for a slight loss in luminosity (per free spectral range). Thus, in effect, the single-etalon spectrometer has been enhanced with a worst case gain of $0.42n_0\delta$ and an upper limit $0.42n_0$. It is possible to compare twin-etalon scanning spectrometer with the spherical Fabry-Perot device using the usual gain expressions by taking the simple approach of increasing the throughput of the classical plane Fabry-Perot device by the factor $0.42n_0\delta$. The results, for $\delta=10^{-2}$, show that at below a ~50-m spacer, the twin-etalon scanning spectrometer with 15-cm diameter flats is more luminous in the visible region. Although the above result is based on the usual approximations, the instrument is still below the diffraction-limited finesse point, and results show that for usual spacers, the twin-etalon scanning spectrometer has at least as good a throughput as the spherical Fabry-Perot device. It is interesting to note that twin-etalon scanning spectrometer can be matched to the angular spread of given arbitrary extended source, without any change to the resolution and without the need of an optical transformation, as well as being able to examine parts of such a source at will under the same conditions with only a loss in luminosity.

The practical considerations of the twin-etalon scanning spectrometer etalon include the tolerance to which the two etalon spacers must be equal, the mirrors which must be supported by finite thickness imperfect substrates, and the degree of parallelism to which the etalons must be brought together with respect to each other. Earlier, the effects of having the etalons varying by 1 order from being identical has been discussed, and the treatment for more than 1 order apart is easily extended to show that, if the two etalons are different by $l$ orders, the number of useful rings is equal to $K=\delta n_0 \, l^{-1}$, where $\delta$ is the arbitrary mismatch parameter discussed earlier and whose practical value is $\sim 10^{-2}$.

Using the results of the previous example, where a 1-order mismatch of the etalons allowed the use of 476 fringes, it was found that reasonable mismatches of, say, 5 orders still allows the use of almost 100 fringes. The amount of lack of parallelism tolerable between the two etalons can be expressed again by the mismatch parameter $\delta$, and the angle associated with this parameter $\alpha$ is given approximately by $\alpha \approx \delta(2n_0K)^{-\frac{1}{2}}$, where K is the number of rings used. Again, using the example of 15.2-cm diameter mirrors and a 1.5-cm spacer, the tolerable lack of parallelism for 100 useful rings for a mismatch $\delta=10^{-2}$ is ~0.15 mdeg. The equivalent statement is then a tolerance of about one wave over the 15-cm aperture of the etalons, which is a strict, but not impossible, requirement.

The presence of mirror substrates brings about a number of drawbacks. First, the subtrates may not be perfectly flat, and the mirrors deposited on the surface will take the shape of that surface. The loss of instrumental quality associated with this effect has been accounted for in the $a_n$ of Equations 4 and 5. Second, the light must travel through the subtrate, and inhomogeneities of the medium will disturb the wave fronts. And last, the finite thickness of the substrate does not allow the etalons to be brought infinitely close together, thus introducing four extra (unwanted) etalons caused by reflections among the mirrors.

In the ideal twin-etalon scanning spectrometer case, a third etalon has been automatically introduced, but it was purposely not discussed for the sake of clarity. The effects of inhomogeneities of the index of refraction $\mu$ of the mirror substrate are more difficult to handle, since the little, if any, control can be maintained over them. Nevertheless, these effects can be considered as those index of refraction inhomogeneities which are equivalent to a prism that would displace a fringe (actually part of it) by the mismatch parameter $\delta$. The approximate formula is $$\frac{\Delta\mu}{\mu} = \frac{\sigma\mu}{\sqrt{2n_0K}}, \tag{8}$$

where $\mu$ is the index of refraction of the mirror substrate, and using the example of $\delta=10^{-2}$, $n_0=47,000$ and $K=100$ rings, the tolerance of homogeneity of the substrates is $(\Delta\mu)/\mu \approx 4\times 10^{-6}$. Since usually two separate etalons are used in the twin-etalon scanning spectrometer, the inhomogeneity of each mirror substrate is then about one-half of the previous value, say $(\Delta\mu)/\mu \leq 2.0\times 10^{-6}$, which is practical.

The effects of the unwanted etalons due to the interaction between the mirrors of the separate etalons can be minimized by forcing the distance between the two etalons to be large compared with the spacers of the etalon. This, in addition to the lack of parallelism tolerance between the two etalons of interest, tends to reduce the unwanted etalon(s) effects to negligible values but at the cost of lowering the gain. The loss occurs because the second etalon will now occupy a finite angular span, and some of the beams emanating from the first etalon will completely miss the second. This effect is particularly true for beams associated with orders far from the central order. For example, for 15.2-cm diameter etalons with 1.5-cm spacing ($n_0 \approx 47,000$) and separated by 72 cm, no beams associated with the 1000th (and beyond) fringe away from the central order of the first etalon will reach the second etalon. The example shows not only the limitation of the possible gain but also the progressive vignetting of the beams as this limit is reached with the consequent loss in effective gain. Using the previous twin-etalon scanning spectrometer example, but with a practical spacing between the two etalons of $\sim 10$ cm, it was found that geometrical efficiencies of $>0.9$ are possible with up to 50 fringes.

The twin-etalon scanning spectrometer requires only three reflecting surfaces, and this can be easily achieved with a solid etalon and one coated flat or with three independent coated flats for a more versatile instrument than as shown in FIGS. 6b and c. In the latter case, the tolerance for substrate inhomogeneities can be relaxed since the radiation need traverse but one substrate, not two as implied in the earlier discussion. A direct corollary of this usage is the reduction of parasitic (unwanted) etalons in the system to one, that is, the same number as in the ideal twin-etalon scanning spectrometer case.

Up to this point, the discussion has been of two etalons of equal reflectivity R, and this is what has been shown in the figures, since it is the least uncertainty case. For unequal reflectivity etalons, the variances of Equations 4 and 5 will increase by the factor $[(1-R_1)^{-1}(1-R_2)^{-1}(1+R_1)(1+R_2)(1-R_0)^2(1+R_0)^2]$, where $R_1 R_2 = R_0^2$ and where $a^*$ in the figures is a single-etalon width derived from $R_0$ by the usual relations.

In the derivations, a single line source has been assumed with the presence of a continuum background being ignored. The addition of a continuum background can easily be incorporated, however, and the results show that the background transmitted by the twin-etalon scanning spectrometer relative to the single-etalon plane Fabry-Perot device (both at their optimum operation) is 0.78 and 3.77 for temperature and wind determinations, respectively. Note that this result is the same as that obtained for the luminosity gain(s). Thus this loss of transmission (temperature case only) improves the signal-to-noise ratio (SNR) of the twin-etalon scanning spectrometer by 1.36 relative to the single-etalon single-aperture plane Fabry-Perot device. This result is applicable only when the flux passed by twin-etalon scanning spectrometer is such that the uncertainty of determination is the same as for a single-etalon device, i.e., when over 2 orders have been used with twin-etalon scanning spectrometer. The general formula for the increase in SNR is $0.88(K)^{\frac{1}{2}}$, where K is the number of fringes or more correctly free spectral ranges used. Therefore, when a twin-etalon scanning spectrometer multiplex instrument is used in a measurement where the background is larger than the line source, it has a definite advantage over the single-etalon Fabry-Perot device.

Extension of the twin-etalon scanning spectrometer to multiple line sources can be made. The twin-etalon scanning spectrometer behaves the same as the single-etalon plane Fabry-Perot device (i.e., line overlap, order overlap), and then it becomes necessary to prefilter the spectral regions of interest. The twin-etalon scanning spectrometer has the advantage over multiple annuli devices in that it is independent of the frequency of the radiation within the spectral region where the mirror coatings are useful.

The techniques developed here apply to the more general case of two or more etalons in series to obtain other advantages, such as selectivity, while still operating at high resolution. In the case of the twin-etalon scanning spectrometer, an increase of throughput has been the main advantage, and to realize it, scanning of one etalon with respect to the other is necessary. As mentioned earlier a mismatch of the spacers providing separation of the light transmission means (mirrors) of the two etalons in a twin-etalon scanning spectrometer gives rise to rings of luminosity that move in and out of the center of the field. This overlap of the mismatched fringes has the properties of a low order etalon, i.e., a large free spectral range, but coupled with the high resolution of the twin-etalon scanning spectrometer etalon(s). Thus, if the requirement of equal spacing is relaxed to include nonequal spacers and the etalons are simultaneously and equally scanned with respect to frequency (assuming that at the beginning 2 orders have been made to overlap), the principle of the Pepsios spectrometer is obtained. In practice, it is found necessary to use another etalon to prevent radiation from passing through the next overlap of the two initial etalons.

The rather large gain in flux of a twin-etalon scanning spectrometer, relative to a conventional Fabry-Perot device, is of interes and usefulness in investigations of planetary, astronomical, astrophysical and laboratory interest where the time required to perform a measurement, or observation, will be decreased by the flux gain of the twin-etalon scanning spectrometer device. For instance, the ability to use a modest twin-etalon scanning spectrometer device with a flux gain of, say, 720 allows an astronomical measurement in one minute rather than in 12 hours of telescope time that would be required with a conventional Fabry-Perot device. Another way to phrase the above is to say that a telescope light gathering ability has been increased, and more efficient use of the available telescope time can be made.

Use of the twin-etalon scanning spectrometer of this invention has been made to determine vertical motion of the neutral thermosphere at midlatitude and such results are reported in my article entitled "Vertical Motions of the Neutral Thermosphere at Midlatitude", Geophysical Research Letters, Vol. 9, No. 5, May 1982, pages 555–557, which article is hereby included by reference. The spectrometer utilized consisted of two identical (15 cm diameter) Fabry-Perot etalons in tandem. Slight mismatches, i.e., on the order of $\lambda/4$, in the optical spacing of one etalon with respect to the other modulated the intensity of the radiation passing through the device, leading to a high-luminosity, high-resolution spectrometer with quite similar (spectroscopic) characteristics to the typical Fabry-Perot spectrometer. The theoretical luminosity gain of the twin-etalon scanning spectrometer can be very large (ca. 40,000 for the device employed), but practical considerations lower this gain to more modest values of less than 1000.

In order to insure stability and comparability of the measurements reported here, a laboratory wavelength reference measurement (NeI 630.47892 nm) was made previous to and after each sky measurement. Because of the introduction of the laboratory reference, the time between consecutive sky measurements is increased and it is typically of the order of 90 to 120 seconds. In the present measurement, the technique of coherently adding a number of short scans (9-second instrumental cycle time) until a suitable SNR is reached was utilized, and this technique has the advantage of minimizing emission rate variations of the night sky [OI] radiation.

The first determinations relative to built-in laboratory reference are shown in FIG. 14, where zero wind is arbitrarily set at the mean value of the vertical (zenith) measurements. In this FIGURE, as well as in other FIGURES, the line-of-sight winds are present, where a positive valued wind denotes downward and equatorward motion for the zenith and north measurements, respectively. The latter measurements are made at 20° elevation.

The outstanding feature of the measurements shown in FIG. 14 is the variability of the determined winds (i.e. excursions of about 40 m/s), while in general the behavior of the motions in the two directions of observation is quite similar. Nevertheless, there exist variations in the motions in the two directions of observation which seem to occur at different times. Note, for instance, the relative stability of the North direction winds from 7:30 UT to 7:50 UT, while the zenith winds undergo a (statistically) significant variation of about 30 m/s.

FIG. 15 shows zenith measurements taken shortly after those of FIG. 14, where a recurrent variation in the winds separated by about 40 to 45 minutes were observed. FIG. 16 shows both the zenith measurements of FIGS. 14 and 15 to more clearly indicate the roughly 40 minute time variation. FIG. 17 shows measurements for the next clear night, where for the sake of clarity we have omitted showing the uncertainties of measurement (typical values of this uncertainty range from 4 m/s to 6 m/s), and again the near 40 minute oscillation is observable for both components.

The results given in FIGS. 13 through 17 explain why the earlier low time resolution vertical measurements tend to cluster about a (zero) mean value. With the technique of coherently adding the 9-second cycle time scans over a period of time ($>20$ min) the variations in the winds were essentially filtered out, thus the zenith winds were in general a reasonable reference for the measurements.

As can be appreciated from the foregoing, a high-luminosity interference spectrometer is shown that has a large gain relative to the single-aperture single-etalon Fabry-Perot spectrometer. This invention thus provides an improved spectrometer and spectrometry method.

What is claimed is:

1. A twin-etalon spectrometry device, comprising: first and second spaced etalon means, said first etalon means being adapted to receive radiation from a radiation source and provide a radiation output at first angles of transmission, said second etalon means being aligned in series with said first etalon means to receive said output from said etalon means and provide a radiation output at second angles of transmission, said first and second etalon means being positionable with respect to one another so that in at least one position said second etalon means provides an output substantially at said first angles of transmission when said first and second etalon means are substantially identical; and control means effecting one of said etalon means to cause an intentional mismatch of said first and second angles of transmission and thereby modulate the radiation passing through said etalon means for luminosity enhancement.

2. The device of claim 1 wherein said first and second etalon means each include first and second radiation transmission means.

3. The device of claim 2 wherein said radiation is light and wherein said first and second radiation transmission means are mirrors.

4. The device of claim 3 wherein said first and second transmission means of each of said first and second etalon means include separate mirrors.

5. The device of claim 3 wherein said first and second radiation means are formed by at least one common mirror.

6. The device of claim 2 wherein said control means is connected to vary the spacing between said first and second radiation transmission means of one of said first and second etalon means.

7. The device of claim 6 wherein said control means is connected with said first and second radiation transmission means of one of said etalon means to cause a mismatch of up to $\lambda/4$.

8. The device of claim 6 wherein said control means is connected with said second etalon means to vary the spacing of said first and second radiation transmission means of said second etalon means.

9. The device of claim 6 wherein said control means includes means for mechanically positioning said first and second radiation transmission means of one of said etalon means.

10. The device of claim 9 wherein said positioning means includes a piezoelectric mechanical driver.

11. The device of claim 2 wherein said control means includes means for controlling said radiation transmission path to thereby effectively vary the positioning between said first and second radiation transmission means of said one of said first and second etalon means.

12. The device of claim 1 wherein said first etalon means is adapted to substantially continuously receive radiation from a line emission radiation source.

13. The device of claim 12 wherein said line emission radiation source is a light source.

14. The device of claim 1 wherein said device includes detector means positioned to receive said radiation output from said second etalon means.

15. A method for increasing spectrometer luminosity, said method comprising:
providing first and second etalon means each of which provides an output responsive to received radiation that has predetermined angles of transmission;
positioning said second etalon means in alignment with said first etalon means to receive the output therefrom; and
causing one of said etalon means to vary said output so that at least in one instance the outputs of said first and second etalon means have the same angles of transmission and in other instances an intentional mismatch is introduced to thereby modulate said radiation passing through said etalon means for luminosity enhancement.

16. The method of claim 15 wherein one of said etalon means is caused to introduce a mismatch in said other instance of up to $\lambda/4$.

17. The method of claim 16 wherein said mismatch is caused to be progressive from maximum transmission of radiation at said one instance to a minimum transmission of radiation when said mismatch is $\lambda/4$.

18. The method of claim 17 wherein said method includes collecting said modulated radiation and displaying an indication thereof.

* * * * *